United States Patent
Parkins et al.

(10) Patent No.: US 12,504,544 B2
(45) Date of Patent: Dec. 23, 2025

(54) GNSS POSITIONING WITH FIXING OF CARRIER RANGE AMBIGUITIES

(71) Applicant: u-blox AG, Thalwil (CH)

(72) Inventors: Alex Parkins, Thalwil (CH); Cecile Mongredien, Thalwil (CH); Ville Joensuu, Thalwil (CH)

(73) Assignee: u-blox AG, Thalwil (CH)

( * ) Notice: Subject to any disclaimer, the term of this patent is extended or adjusted under 35 U.S.C. 154(b) by 420 days.

(21) Appl. No.: 17/861,372

(22) Filed: Jul. 11, 2022

(65) Prior Publication Data

US 2023/0015483 A1 Jan. 19, 2023

(30) Foreign Application Priority Data

Jul. 16, 2021 (EP) ..................................... 21186191

(51) Int. Cl.
*G01S 19/44* (2010.01)
*G01S 19/42* (2010.01)
*G01S 19/43* (2010.01)

(52) U.S. Cl.
CPC .............. *G01S 19/44* (2013.01); *G01S 19/42* (2013.01); *G01S 19/43* (2013.01)

(58) Field of Classification Search
CPC ........... G01S 19/44; G01S 19/43; G01S 19/42
(Continued)

(56) References Cited

U.S. PATENT DOCUMENTS

| | | | |
|---|---|---|---|
| 8,830,121 B2 * | 9/2014 | Vollath | G01S 19/44 342/357.27 |
| 10,564,296 B2 * | 2/2020 | Hide | G01S 19/44 |

(Continued)

FOREIGN PATENT DOCUMENTS

| | | | | |
|---|---|---|---|---|
| EP | 4145182 A1 * | 3/2023 | ............. | G01S 19/44 |
| WO | WO 2008/150390 A1 | 12/2008 | | |
| WO | WO 2021/119493 A1 | 6/2021 | | |

OTHER PUBLICATIONS

Teunissen, "Theory of integer equivariant estimation with application to GNSS," Journal of Geodesy, 2003, 77:402-410.
(Continued)

*Primary Examiner* — Chuong P Nguyen
(74) *Attorney, Agent, or Firm* — Fish & Richardson P.C.

(57) ABSTRACT

A method and apparatus are provided for calculating a position based on Global Navigation Satellite Systems (GNSS) signals. The method includes estimating a first state vector comprising a first set of float carrier range ambiguities using a first estimator, based on first observations of the GNSS signals; and estimating a second state vector comprising a second set of float carrier range ambiguities using a second estimator, based on second observations of the GNSS signals. It further comprises fixing one or more first carrier range ambiguities, using a first strategy, based on the first set of float carrier range ambiguities; and fixing one or more second carrier range ambiguities, using a second strategy, based on the second set of float carrier range ambiguities. The first strategy for fixing the one or more first carrier range ambiguities is different from the second strategy for fixing the one or more second carrier range ambiguities. The method further includes: selecting a set of fixed carrier range ambiguities from among a plurality of different sets of fixed carrier range ambiguities, the plurality including at least the one or more fixed first carrier range ambiguities and the one or more fixed second carrier range ambiguities; and estimating the position based on the selected set of fixed carrier range ambiguities.

14 Claims, 3 Drawing Sheets

(58) Field of Classification Search
USPC .......................... 342/357.27, 357.26, 357.25
See application file for complete search history.

(56) References Cited

U.S. PATENT DOCUMENTS

| | | | |
|---|---|---|---|
| 10,809,388 B1* | 10/2020 | Carcanague | G01S 19/44 |
| 11,016,199 B1* | 5/2021 | Grgich | G01S 19/44 |
| 11,372,114 B2* | 6/2022 | Carcanague | G01S 19/252 |
| 11,681,050 B2* | 6/2023 | Grgich | G01S 19/44 |
| | | | 342/357.62 |
| 11,860,260 B2* | 1/2024 | Carcanague | G01S 19/44 |
| 12,429,603 B2* | 9/2025 | Parkins | G01S 19/51 |
| 2011/0140959 A1 | 6/2011 | Vollath | |
| 2011/0156949 A1* | 6/2011 | Vollath | G01S 19/44 |
| | | | 342/357.27 |
| 2018/0180743 A1 | 6/2018 | Hide et al. | |
| 2023/0266476 A1* | 8/2023 | Parkins | G01S 19/252 |
| | | | 342/352 |

OTHER PUBLICATIONS

Teunissen, "The least-squares ambiguity decorrelation adjustment: a method for fast GPS integer ambiguity estimation," Journal of Geodesy, 1995, 70:65-82.
Extended European Search Report in European Appln. No. 21186191. 9, mailed on Mar. 31, 2022, 10 pages.

* cited by examiner

GNSS POSITIONING WITH FIXING OF CARRIER RANGE AMBIGUITIES

CROSS-REFERENCE TO RELATED APPLICATIONS

This application claims priority to European Application No. EP21186191.9, filed on Jul. 16, 2021, the contents of which are incorporated herein by reference in their entirety.

FIELD OF THE INVENTION

The present invention relates to positioning using Global Navigation Satellite Systems (GNSS). In particular, it relates to positioning that is based at least in part on measurements of the carrier phase of GNSS signals.

BACKGROUND OF THE INVENTION

Techniques for GNSS positioning are well known in the art. Existing GNSS include the Global Positioning System (GPS), Galileo, GLONASS, and BeiDou. Each GNSS comprises a constellation of satellites, also known in the art as "space vehicles" (SVs), which orbit the earth. Typically, each SV transmits a number of signals. These are received by a receiver whose position it is desired to calculate. The receiver can make a number of ranging measurements using the signals, to derive information about the distance between the receiver and respective satellites. When a sufficient number of measurements can be made, the receiver's position can then be calculated by multilateration.

A pseudorange is one kind of ranging measurement. This is a measurement of the code phase of a pseudorandom noise (PRN) code modulated onto a carrier signal transmitted by a SV. Pseudorange measurements can achieve positioning accuracy of the order of metres. However, they can suffer from reduced accuracy/reliability in the presence of multipath—for example, in dense urban environments.

Carrier-phase measurements are another kind of ranging measurement. Performing ranging measurements on the carrier, as well as or instead of the modulating PRN code, can enable greater accuracy in the position fix—for example, accuracy of the order of centimetres may be possible. Carrier-phase measurements may also be more robust in the presence of multipath.

However, one difficulty with carrier-phase measurements is that they contain an inherent ambiguity. Although it may be possible to measure the phase of the carrier accurately within a given cycle (wavelength), this does not uniquely determine the ranging measurement, because there are an unknown integer number of wavelengths of the carrier between the SV and the receiver. The benefits of carrier-phase based positioning can only be realised if these ambiguities are resolved.

Various techniques have been proposed for "fixing" the ambiguities. This involves constraining the solution based on the knowledge that the ambiguities are integer quantities. In some cases, these techniques fix each ambiguity to an integer value; however, this is not essential. In some cases, ambiguities may be fixed to integer values but then further processed such that the eventual "fixed" ambiguities are floating point values. In some cases, linear combinations of ambiguities may be fixed, instead of individual ambiguities. In some cases, a subset of the ambiguities may be fixed. One known technique for fixing carrier-phase ambiguities is the Least squares AMBiguity Decorrelation Adjustment (LAMBDA) method (Teunissen P J G, "The least-squares ambiguity decorrelation adjustment: a method for fast GPS integer ambiguity estimation", J Geod 70:65-82, 1995).

It would be desirable to provide alternative, improved techniques for fixing carrier-phase ambiguities (also referred to herein as carrier range ambiguities).

SUMMARY OF THE INVENTION

Carrier range ambiguities can be fixed using different strategies. There might be no single "best" strategy that performs optimally in all circumstances. Rather, different strategies may have different strengths and weaknesses, and may be more or less suited to particular circumstances.

For example, fixing of carrier range ambiguities can be applied to individual carrier range ambiguities, or to linear combinations of carrier range ambiguities. The linear combinations may be based on combinations of carrier signals transmitted by the same SV, or combinations of carrier signals transmitted by different SVs. In some strategies, rather than fixing the absolute, individual ambiguities, only the differences between the ambiguities are fixed.

Although in general, fixing a combination of two individual ambiguities may produce a weaker constraint than fixing the absolute, individual ambiguities themselves, it can nevertheless have significant advantages in some circumstances. For example, it is possible to fix "widelane" ambiguities. A widelane ambiguity refers to the difference between the individual ambiguities associated with two carrier signals. Many GNSS SVs broadcast an L1 carrier and an L2 carrier. A widelane ambiguity can be calculated for (L2−L1). This refers to the difference between the L1 carrier range ambiguity and the L2 carrier range ambiguity. However, more generally, widelane ambiguities can be calculated between any pair of carrier signals transmitted at different frequencies by the same GNSS satellite.

Widelane ambiguities may be easier to resolve than the individual ambiguity for each carrier signal, also referred to herein as an uncombined carrier range ambiguity or simply uncombined ambiguity. They can also be more robust against residual ionospheric errors. However, they provide a less precise position solution than fixing individual ambiguities. Nevertheless, the position solution is still more precise than if the ambiguities were not fixed at all.

The present inventors have recognised that it would be desirable to obtain the benefits of more than one ambiguity-fixing strategy, since different strategies may do better or worse depending on the circumstances (for example, depending on the satellite signals that are available, the multipath conditions around the receiver, ionospheric errors, etc.)

According to one aspect there is provided a method of calculating a position based on GNSS signals, the method comprising:

estimating a first state vector comprising a first set of float carrier range ambiguities using a first estimator, based on first observations of the GNSS signals;

estimating a second state vector comprising a second set of float carrier range ambiguities using a second estimator, based on second observations of the GNSS signals;

fixing one or more first carrier range ambiguities, using a first strategy, based on the first set of float carrier range ambiguities;

fixing one or more second carrier range ambiguities, using a second strategy, based on the second set of float carrier range ambiguities, wherein the first strategy for fixing the one or more first carrier range ambiguities is different from the second strategy for fixing the one or more second carrier range ambiguities, the method further comprising:

selecting a set of fixed carrier range ambiguities from among a plurality of different sets of fixed carrier range ambiguities, the plurality including at least the one or more fixed first carrier range ambiguities and the one or more fixed second carrier range ambiguities; and estimating the position based on the selected set of fixed carrier range ambiguities.

"Fixing" a float carrier range ambiguity means using the integer property of the ambiguity to constrain at least one estimated state. Fixing a float carrier range ambiguity may comprise fixing it to an integer value. However, the "fixing" may comprise additional processing of the float carrier range ambiguity before or after fixing it to the integer value. This may result in the fixed carrier range ambiguity taking a non-integer value. Consequently, in some embodiments, the fixed carrier range ambiguities may be fixed integer carrier range ambiguities. In other embodiments, the fixed carrier range ambiguities may be non-integer carrier range ambiguities—this is also known as "partial" fixing.

For example, the method may comprise: linearly transforming the first set (or the second set) of float carrier range ambiguities; fixing one or more first (or second) carrier range ambiguities based on the linearly transformed first set (or linearly transformed second set); and inverse transforming the one or more fixed first carrier range ambiguities (or the one or more fixed second carrier range ambiguities).

The first state vector may further comprise position variables. Similarly, the second state vector may further comprise position variables.

The method may be repeated for each of a plurality of epochs (updates).

In general, each of the first set and the second set comprises one or more float carrier range ambiguities. In most cases, each set comprises multiple float carrier range ambiguities. However, in some embodiments, or for some epochs, the first set may comprise just one float carrier range ambiguity and/or the second set may comprise just one float carrier range ambiguity. This may be the case, in particular, if a number of carrier range ambiguities have already been fixed at a previous epoch.

The one or more fixed first carrier range ambiguities may be a complete set of carrier range ambiguities, wherein a first carrier range ambiguity is fixed for every observed carrier in every observed GNSS signal. Alternatively, the one or more fixed first carrier range ambiguities may be a partial set of carrier range ambiguities, wherein the number of fixed first carrier range ambiguities is less than the number of observed carriers in the observed GNSS signals. The same is true for the one or more fixed second carrier range ambiguities.

Optionally, the method may comprise: estimating a further state vector comprising a further set of float carrier range ambiguities using a further estimator, based on further observations of the GNSS signals; and fixing one or more further carrier range ambiguities, using a further strategy, based on the further set of float carrier range ambiguities, wherein the further strategy is different from each of the first and second strategies, and wherein the plurality of different sets of fixed carrier range ambiguities also includes the one or more fixed further carrier range ambiguities.

The position may be estimated based on the selected set of fixed carrier range ambiguities using a third estimator. An update interval of the third estimator may be shorter than an update interval of the first estimator and the second estimator. That is, the third estimator may produce position estimates more frequently than the first and second estimators produce estimates of the float carrier range ambiguities. An update interval is the time between successive estimates produced by an estimator—that is, the time between iterations of the estimation. The first and second estimators may have the same update interval. The time of an update is known as an "epoch".

Alternatively or in addition, the position may be estimated based on the selected set of fixed carrier range ambiguities using at least one of the first estimator and the second estimator.

In some embodiments, the first and second estimators may be identical. The further estimator (if used) may also be identical to the first and second estimator.

The one or more fixed first carrier range ambiguities may be fed back into the first estimator in a subsequent iteration of the first estimator.

An ambiguity may be considered to have been fixed "successfully" if a confidence level associated with the fixed ambiguity is above a predetermined threshold. The confidence level may depend at least in part on a distance between the fixed ambiguity and the respective float ambiguity. If an alternative fixed ambiguity is a similar distance from the float ambiguity, then the confidence level may be low. In some embodiments, the one or more fixed first integer ambiguities are fed back only if the associated confidence level is above a predetermined threshold.

The first estimator, when estimating the first state vector in the subsequent iteration, may estimate only states other than the one or more fixed first carrier range ambiguities. The first estimator may constrain the estimation to hold the one or more fixed first carrier range ambiguities constant.

The one or more fixed second carrier range ambiguities may be fed back into the second estimator in a subsequent iteration of the second estimator. In some embodiments, the one or more fixed second integer ambiguities are fed back only if the associated confidence level is above a predetermined threshold.

The second estimator, when estimating the second state vector in the subsequent iteration, may estimate only states other than the one or more fixed second carrier range ambiguities. The second estimator may constrain the estimation to hold the one or more fixed second carrier range ambiguities constant.

The one or more fixed first carrier range ambiguities may comprise or consist of individual carrier range ambiguities, wherein the first strategy comprises fixing the individual carrier range ambiguities. Each individual carrier range ambiguity relates to a given carrier frequency of a given SV.

The one or more fixed second carrier range ambiguities may comprise or consist of combinations of carrier range ambiguities, wherein the second strategy comprises fixing the combinations of carrier range ambiguities. Each combination of carrier range ambiguities may comprise or consist of a linear combination of ambiguities for different carrier frequencies of the same SV.

The one or more fixed second carrier range ambiguities may comprise or consist of widelane carrier range ambiguities. A wide lane ambiguity is formed by the difference between the individual carrier range ambiguities of carrier signals transmitted at different frequencies from the same satellite (SV).

The one or more fixed widelane carrier range ambiguities may be fed back into the second estimator in a subsequent iteration of the second estimator, wherein the second estimator, when estimating the second state vector in the subsequent iteration, constrains the second set of float carrier range ambiguities such that the widelane carrier range ambiguities are respected.

For example, if the widelane combination is based on the difference between the ambiguities for the L1 and L2 carriers, the second estimator may estimate the L1 ambiguity in the subsequent iteration. The L2 ambiguity may then be set by combining the estimated L1 ambiguity with the corresponding fixed wide lane carrier range ambiguity. In other words, the L1 ambiguity is estimated by the estimator, but the L2 ambiguity is not estimated—it is forced to track the L1 ambiguity, so that the fixed wide lane ambiguity is respected.

The one or more fixed first carrier range ambiguities may comprise or consist of individual carrier range ambiguities; and the one or more fixed second carrier range ambiguities may comprise or consist of combinations of carrier range ambiguities, wherein, if the individual carrier range ambiguities are fixed with a confidence exceeding a threshold, they are selected for use in estimating the position, and if the individual carrier range ambiguities are not fixed with a confidence exceeding the threshold, but the combinations of carrier range ambiguities are fixed with a confidence exceeding a threshold, the combinations of carrier range ambiguities are selected for use in estimating the position.

The threshold applied to the individual carrier range ambiguities may be the same as, or different from, the threshold applied to the combinations of carrier range ambiguities.

The first observations and the second observations may comprise or consist of the same observations.

The first estimator and the second estimator may be identical estimators.

The first estimator may be a first Kalman filter and the second estimator may be a second Kalman filter. The first and second Kalman filters may be identical or different in structure. The third estimator may be a third Kalman filter.

Also provided is a computer program comprising computer program code configured to cause one or more physical computing devices to perform all the steps of a method as summarized above when said computer program is run on said one or more physical computing devices. The computer program may be stored on a computer readable medium, optionally a non-transitory computer readable medium.

Also provided is an apparatus configured to calculate a position based on GNSS signals, the apparatus comprising:
a first estimator, configured to estimate a first state vector comprising a first set of float carrier range ambiguities, based on first observations of the GNSS signals;
a second estimator, configured to estimate a second state vector comprising a second set of float carrier range ambiguities, based on second observations of the GNSS signals;
a first ambiguity resolution unit, configured to fix one or more first carrier range ambiguities, using a first strategy, based on the first set of float carrier range ambiguities;
a second ambiguity resolution unit, configured to fix one or more second carrier range ambiguities, using a second strategy, based on the second set of float carrier range ambiguities; and
a selection unit, configured to select a set of fixed carrier range ambiguities from among a plurality of different sets of fixed carrier range ambiguities, the plurality including at least the one or more fixed first carrier range ambiguities and the one or more fixed second carrier range ambiguities,
wherein the first strategy for fixing the first carrier range ambiguities is different from the second strategy for fixing the second carrier range ambiguities,
and wherein the apparatus is configured to estimate the position based on the selected set of fixed carrier range ambiguities.

The apparatus may be a GNSS receiver. The GNSS receiver may further comprise: an RF front end, configured to receive and down-convert the GNSS signals; and a baseband processor, configured to generate the first observations and the second observations by analysing the GNSS signals received and down-converted by the RF front end.

The apparatus may further comprise a third estimator, wherein the third estimator is configured to estimate the position based on the selected set of fixed carrier range ambiguities.

BRIEF DESCRIPTION OF THE DRAWINGS

The invention will now be described by way of example with reference to the accompanying drawings, in which.

DETAILED DESCRIPTION

Reference will now be made in detail to embodiments of the invention, examples of which are illustrated in the accompanying drawings. The described embodiments should not be construed as being limited to the descriptions given in this section; the embodiments may have different forms.

Figure 1:
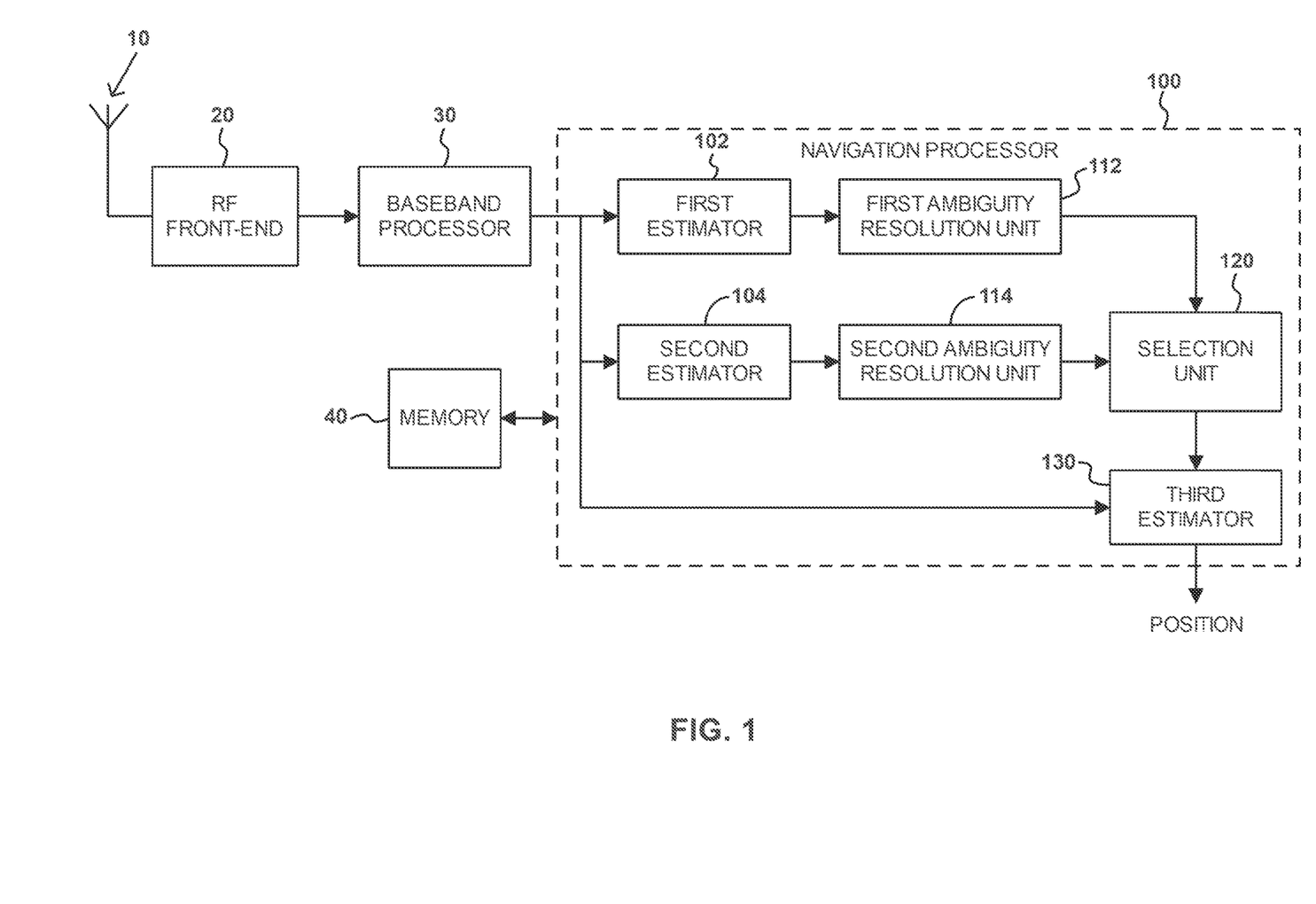
FIG. 1 is a schematic block diagram of a GNSS receiver according to an example.

FIG. 1 is a block diagram of a GNSS receiver according to an example. The GNSS receiver may be configured to receive satellite signals from a single GNSS constellation (for example, GPS), or it may be configured to receive satellite signals from multiple constellations (for example, GPS, Galileo, and BeiDou). The GNSS receiver comprises an antenna 10 for receiving satellite signals. An RF front-end 20, coupled to the antenna 10, is configured to down-convert and digitise the satellite signals received via the antenna 10. The RF front-end essentially conditions the signals for subsequent signal processing. Other typical tasks performed by the front-end include filtering, amplification and automatic gain control.

The GNSS receiver further comprises a baseband processor 30, coupled to the output of the RF front-end. The baseband processor 30 is responsible for processing the down-converted, digitised satellite signals output by the RF front-end, to produce GNSS observables. The observables include code pseudoranges and carrier-phase measurements. They may optionally also include additional information, such as a Doppler frequency and carrier-to-noise ratio for each carrier of each satellite signal received the front-end.

The GNSS receiver further comprises a navigation processor 100, coupled to the baseband processor 30, and configured to receive the GNSS observables from it. Also provided is a memory 40 in communication with the navigation processor 100. The memory 40 is configured to store software/firmware to be executed on the navigation processor. The software/firmware is configured to control the navigation processor to carry out a processing method according to the present example. The memory may also be configured to store data that is used as input to the processing method and/or to store data that is output by the processing method.

The navigation processor 100 is shown as comprising a number of functional units. In the present example, these functional units are defined by modules in the software/firmware running on the processor 100. However, it should be understood that, in other examples, these units may represent hardware units that are configured to perform the same functions as the equivalent software units. Therefore, the following description will make no distinction between software- and hardware-based implementations.

As shown in the block diagram of FIG. 1, the navigation processor 100 comprises a first estimator 102; and a second estimator 104. The first and second estimators 102 and 104 are configured to receive GNSS observables from the baseband processor 30. The processor 100 further comprises a first ambiguity resolution unit 112, coupled to an output of the first estimator 102; and a second ambiguity resolution unit 114, coupled to an output of the second estimator 104. The navigation processor 100 also comprises a selection unit 120 and a third estimator 130. The selection unit 120 is coupled to outputs of the first ambiguity resolution unit 112 and second ambiguity resolution unit 114, and is configured to select between them. The third estimator 130 is coupled to an output of the selection unit 120 and is also configured to receive GNSS observables from the baseband processor 30.

In the present example, each of the first, second, and third estimators is a Kalman filter. A Kalman filter is a recursive state estimator. At each of a plurality of time increments (epochs), the Kalman filter estimates the current value of a state vector of state variables, along with their associated uncertainties. The estimate for the current state vector is based on the estimated state from the previous epoch and the current measurements. In the context of navigation, the state variables estimated by the Kalman filter generally include position variables and optionally velocity and other variables. The use of Kalman filtering (also known as linear quadratic estimation) in GNSS navigation is well known in the art and will not be described in further detail here.

A method 200 carried out by the navigation processor 100 of FIG. 1 will now be described, with reference to FIG. 2. In step 202, the first estimator 102 estimates a first state vector. The first state vector includes at least a first set of float carrier range ambiguities; however, it typically also includes additional state variables. For example, it may include position and velocity variables. The first estimator 102 estimates the float carrier range ambiguities (and other state variables) based on all of the current GNSS observables 201. The ambiguities are estimated as real numbers and (in the present implementation) they are stored as floating-point values, because the estimator (a Kalman filter) does not take into account the fact that the actual ambiguities are constrained to be integers. (It should be understood that the ambiguities could be represented as fixed-point values, in other implementations.)

In step 204, the second estimator 104 estimates a second state vector. This includes a second set of float carrier range ambiguities. Like the first state vector, the second state vector typically also includes additional state variables. For instance, it may include position and velocity variables. The second estimator 104 estimates the second set of float carrier range ambiguities in the same way that the first estimator 102 estimates the first set of float carrier range ambiguities. Again, the estimated ambiguities have floating-point values.

Note that the state vectors do not include states for every single SV in each constellation, in the present implementation. In practice, the receiver has biases that make the ambiguities non-integer values. The receiver bias is the same for all signals of the same type—for instance, all GPS L1 signals have the same bias. In order to eliminate these biases, the system chooses a reference signal and compares all measurements of that type with the reference (by subtraction), thereby cancelling the bias. This is equivalent to estimating the bias as a state and constraining the ambiguity of a reference satellite to an integer. Consequently, in the present implementation there is not an ambiguity for every signal from each satellite, because the system does not estimate the ambiguities for the reference signals themselves.

Figure 2:
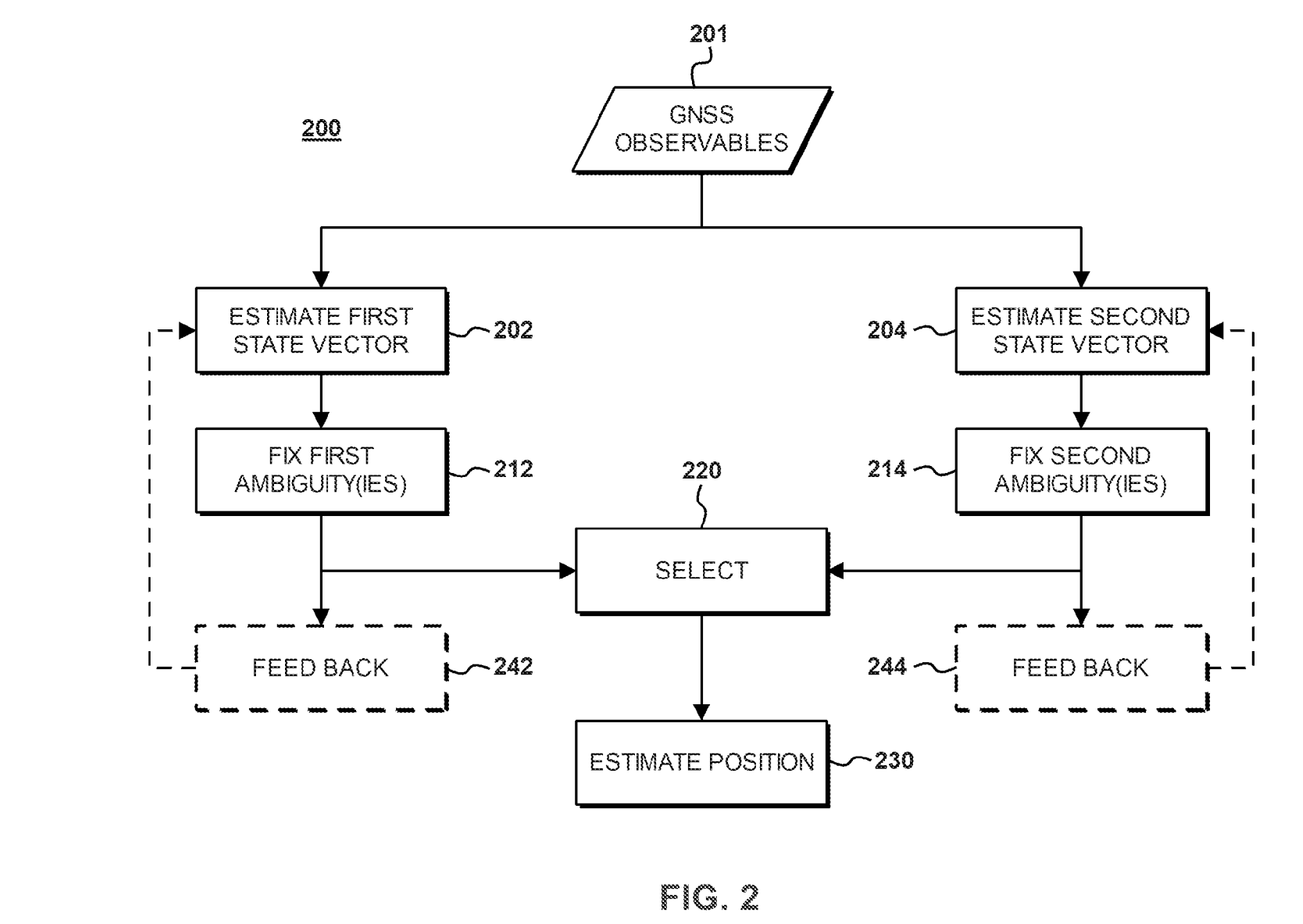
FIG. 2 is a flowchart illustrating a method according to an example.

Although not shown explicitly in FIG. 2, it should be understood that—in general, other than in the very first iteration—the state estimation step 202 is based not only on the current measurements (that is, the GNSS observables 201) but also on the previously estimated first state vector, from the preceding epoch. In other words, the first estimator 102 "remembers" the estimated state from one epoch to the next and uses this information in each update step. This is because—as explained already above—the first estimator 102 is a Kalman filter, in the present example. Similarly, the second estimator 104 is a Kalman filter that retains the estimated second state vector from one epoch to the next. The state estimation step 204 is therefore based not only on the current measurements (GNSS observables 201) but also on the previously estimated second state vector from the preceding update interval.

In step 212, the first ambiguity resolution unit 112 fixes one or more first carrier range ambiguities, using a first strategy, based on the first set of float carrier range ambiguities. In the present example, the first ambiguity resolution unit 112 fixes individual, uncombined carrier range ambiguities for each carrier signal of each SV that has been acquired and tracked by the GNSS receiver and for which observables have been generated by the baseband processor 30. That is, the first strategy involves fixing uncombined ambiguities. In the present example, the LAMBDA method is used to fix the uncombined ambiguities. LAMBDA produces integer-valued fixed ambiguities. In other examples, other algorithms may be used. These include but are not limited to the Best Integer Equivariant (BIE) estimation algorithm (see, for example: P. J. G. Teunissen, "Theory of integer equivariant estimation with application to GNSS", Journal of Geodesy (2003) 77: 402-410).

In step 214, the second ambiguity resolution unit 114 fixes one or more second carrier range ambiguities, using a second strategy, based on the second set of float carrier range ambiguities. In this example, the second ambiguity resolution unit 114 fixes a widelane carrier range ambiguity for each SV. In particular, a widelane carrier range ambiguity is fixed for each SV from which the L1 and L2 signals were successfully acquired and tracked by the GNSS receiver, and for which observables have been generated by the baseband processor 30. Thus, the second strategy involves fixing linearly combined ambiguities. The present example, the LAMBDA algorithm is also used to fix the combined ambiguities, to produce fixed integer ambiguities. Again, it should be understood that other algorithms could alternatively be used.

In step 220, the selection unit 120 receives the one or more fixed first carrier range ambiguities from the first ambiguity resolution unit 112, and receives the one or more fixed second carrier range ambiguities from the second ambiguity resolution unit 114. The selection unit 120 selects between these two sets of fixed ambiguities. In greater detail, the selection unit 120 evaluates confidence values associated with each set of fixed ambiguities, to choose between them. The confidence values quantify the likelihood that each set of ambiguities has been fixed successfully—that is, the likelihood that the fixed ambiguities correctly reflect the number of carrier wavelengths (or the difference in number of carrier wavelengths), for each carrier frequency, between the receiver and the respective SVs. The confidence values may be derived in a variety of ways. In the present example, the confidence is based on the closeness of each float carrier range ambiguity to the respective fixed integer value. In particular, the confidence is determined based on the difference between the float and fixed values for the full set of ambiguities in the metric of the ambiguity covariance matrix, as follows:

$$(\hat{a}-\bar{a}_i)^T G_{\hat{a}}^{-1} (\hat{a}-\bar{a}_i)$$

Here, $\hat{a}$ are the float values, $\bar{a}_i$ are the fixed values of a given candidate set i of fixed values, and $G_{\hat{a}}$ is the covariance matrix of the ambiguities. This distance metric is calculated for several candidate sets of fixed ambiguities, produced according to the LAMBDA algorithm. The best candidate set is identified as the candidate set with the smallest value of the distance metric. The second best candidate set is identified as the candidate set with the second smallest value of the distance metric. In order to have high confidence in the best candidate set, we expect that the best candidate will be closer to the float ambiguities than the second best set. Consequently, the confidence in the best candidate set can be calculated as a ratio of the distances—the second smallest distance divided by the smallest distance. When this ratio is large (that is, much greater than 1), it suggests that the second smallest distance is considerably greater than the smallest distance (implying high confidence in the best candidate set). When this ratio is small (that is, close to 1) it suggests that the second smallest distance is comparable to the smallest distance (implying greater uncertainty and thus lower confidence in the best candidate set).

This confidence value, based on the ratio of second-best to best distances, in the metric of the covariance matrix, is calculated for the fixed first carrier range ambiguities and is also calculated for the fixed second carrier range ambiguities. For the avoidance of doubt, in each case the second best candidate set is discarded after calculation of the confidence-ratio. The fixed first carrier range ambiguities and fixed second carrier range ambiguities are based on the best candidate set, in each case.

The selection unit 120 selects between the sets of fixed ambiguities based on their confidence values, calculated by means of the ratio described above. In the present example, the individual, uncombined ambiguities, produced by the first ambiguity resolution unit 112 are preferred, provided they reach a minimum predetermined threshold confidence level. If the uncombined ambiguities do not reach this minimum threshold, then the combined (widelane) ambiguities, produced by the second ambiguity resolution unit 114, are used, provided that they themselves reach a minimum predetermined threshold confidence level. (If neither set of fixed ambiguities reaches the minimum confidence level required, then no fixed ambiguities are sent to the third estimator 130 in the current update interval.) Note that the minimum thresholds applied to the respective sets of ambiguities may be different from one another. In particular, in the present implementation, the minimum threshold is selected as a function of the number of ambiguities. The first set of ambiguities is larger, because it contains uncombined ambiguities. The second set of (widelane) ambiguities contains at most half the number of uncombined ambiguities. The minimum threshold is set higher for the second set and lower for the first set.

In other examples, other rules could be used to select between the sets of fixed ambiguities. A comparison may be made between the respective confidences in each set of fixed ambiguities. For instance, there may be a much higher level of confidence in the combined (widelane) ambiguities, and a much lower level of confidence in the uncombined ambiguities. In this case, the selection unit 120 may select the widelane ambiguities—even if both sets of ambiguities have exceeded their predetermined minimum threshold confidence levels.

In step 230, the third estimator 130 estimates the position of the receiver, providing a navigation solution based on whichever set of fixed carrier range ambiguities was provided by the selection unit 120 in step 220. In addition to providing an estimate of the position, step 230 may also include estimating other variables, for example, a velocity of the GNSS receiver. In the present example, the first 102, second 104, and third 130 estimators all rely on the same GNSS observables 201 provided by the baseband processor 30. Since the state vectors of the first and second estimators each include position and may further include velocity state variables (as already noted above), it would in principle be possible to obtain the navigation solution directly from one of these estimators. However, in the present example, a separate, third estimator is used for this step. This has the benefit of decoupling an update-interval of the third estimator 130 from the update intervals of the first and second estimators 102 and 104. In particular, the third estimator can provide more frequent updates of the position and optionally velocity state variables, using the most recently available best set of fixed ambiguities. Periodically, when the best set is updated (by the estimators 102 and 104, ambiguity resolution units 112 and 114, and selection unit 120), the third estimator 130 can take this into account. In this way, the third estimator 130 complements the first and second estimators 102 and 104. The third estimator 130 is estimating a smaller state vector, since it does not have to estimate the ambiguities. This makes it computational feasible to run it at a higher update rate (that is, with a shorter update interval/time between epochs). Meanwhile, the first and second estimators 102 and 104 are computationally more intensive to run, because they need to estimate the carrier range ambiguities and therefore they generally have larger state vectors. This computational burden is mitigated by running them less frequently—that is, with a longer update interval. Balancing the tasks in this way can enable the computational resources of the GNSS receiver (in particular, the navigation processor 100) to be used efficiently.

Optionally, fixed ambiguities may be fed back to the respective estimator 102, 104 from which they were derived. This feedback is illustrated by the dashed boxes 242 and 244 and associated dashed arrows in FIG. 2. In step 242, the one or more fixed uncombined carrier range ambiguities are fed back to the first estimator 102 for use at the next epoch. Similarly, in step 244, the one or more fixed combined carrier range ambiguities (fixed widelane ambiguities) are fed back to the second estimator 104 for use at the next epoch. When fixed ambiguities are fed back in this way, the relevant estimator 102, 104 does not need to estimate them at the subsequent epoch. They are instead held constant, while the remaining state variables of the state vector are estimated. Holding uncombined ambiguities constant is straightforward, since they appear explicitly in the first state vector of the first estimator 102. In the present implementation, the combined (widelane) ambiguities do not appear explicitly in the second state vector of the second estimator 104. In order to hold these constant, one of the associated uncombined ambiguities is estimated, while the other is forced to respect the fixed widelane ambiguity. In particular, in the present example, the float carrier range ambiguity is estimated for the L1 carrier; and the L2 float carrier range ambiguity measurement observes (that is, helps to estimate in the filter) the L1 carrier range ambiguity based on the fixed widelane ambiguity. Other implementations are possible. For example, the second estimator could be formulated to estimate the (uncombined, individual) L1 ambiguities and the combined (widelane) ambiguities. In this case, the combined (widelane) ambiguities would appear explicitly in the state vector of the second estimator.

Figure 3:
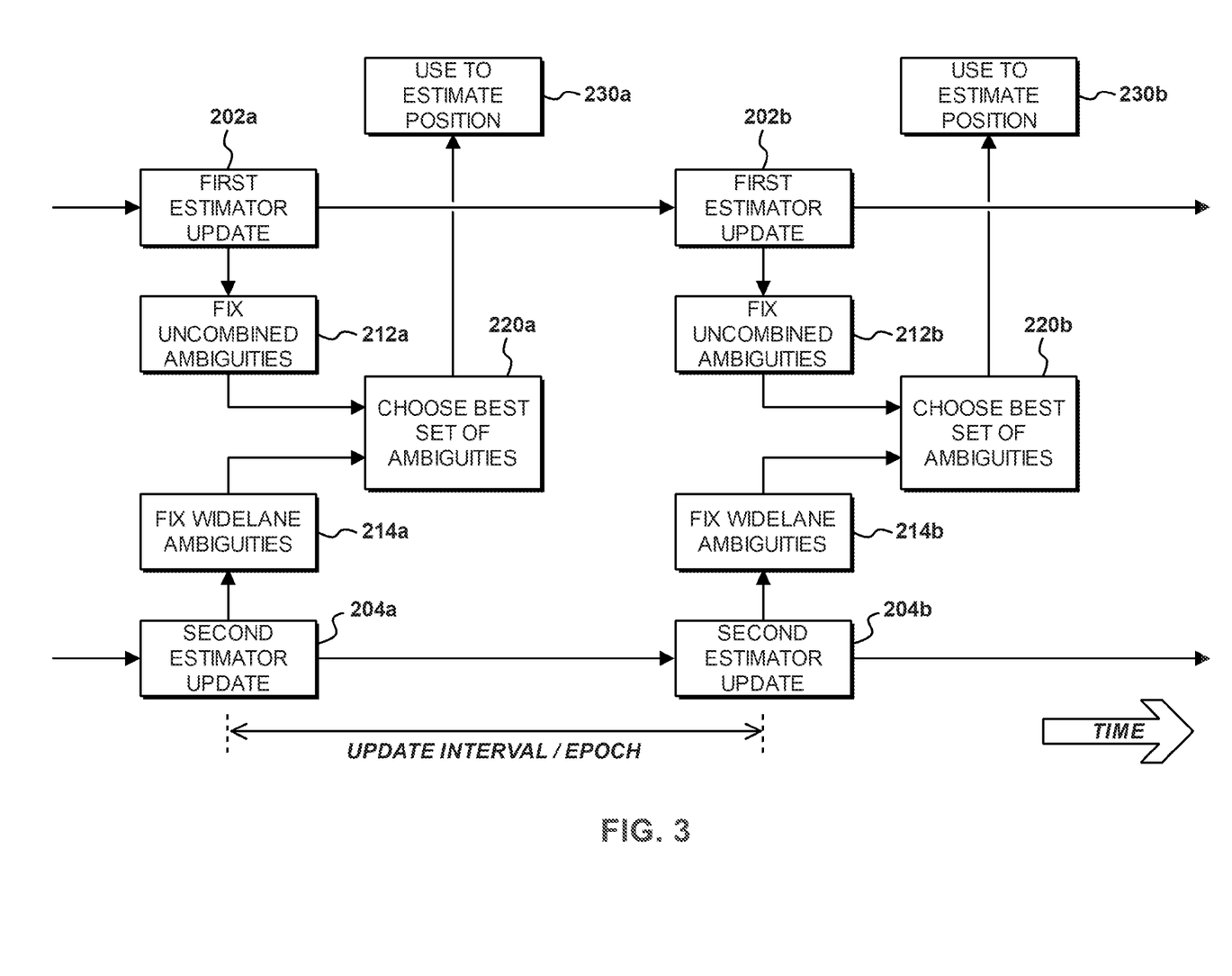
FIG. 3 illustrates an implementation of the method of FIG. 2 over multiple epochs. It should be noted that these figures are diagrammatic and not drawn to scale.

FIG. 3 illustrates the operations performed for two successive epochs by the first and second estimators 102 and 104. Time runs from left to right, in this diagram. The same reference numerals are used as in the method 200 of FIG. 2, with the addition of a suffix "a" to denote the first epoch and "b" to denote the second epoch. In the present example, because the first and second estimators 102 and 104 are identical Kalman filters, and because both of these estimators receive the same GNSS observables 201, the first and second state vectors will be identical after the first iteration (first epoch). That is, the output of the first estimator 102 in the first iteration 202a of step 202 will be identical to the output of the second estimator 104 in the first iteration 204a of step 204. The only difference between the two branches is that the first ambiguity resolution unit 112 fixes the uncombined ambiguities in the first iteration 212a of step 212, but the second ambiguity resolution unit 114 fixes the widelane ambiguities in the first iteration 214a of step 214.

As a result of the different fixing strategies, the two estimators 102 and 104 can diverge in subsequent iterations. The fixed uncombined ambiguities will be fed back to the first estimator 102. (This is step 242, described above; however, for simplicity, this is not shown explicitly in FIG. 3.) Consequently, in the second iteration 202b of step 202, the first estimator 102 will be estimating only the states of the first state vector other than the uncombined ambiguities. On the other hand, the fixed widelane ambiguities will be fed back to the second estimator 104 (step 244, described above—again not shown explicitly in FIG. 3). Consequently, in the second iteration 204b of step 204, the second estimator 104 will be estimating only the states of the second state vector other than the L2 ambiguities. It will estimate the L1 ambiguities and will force the L2 ambiguities to track these estimated L1 ambiguities, according to the fixed widelane ambiguities. The arrow connecting the first iteration 202a by the first estimator 102 to the second iteration 202b represents the first state vector being carried forward ("remembered") from one iteration to the next. Similarly, the arrow connecting the first iteration 204a by the second estimator 104 to the second iteration 204b represents the second state vector being carried forward ("remembered") from one iteration to the next, in the second estimator 104.

In the first iteration 220a of step 220 performed by the selection unit 120, the selection unit 120 chooses the better of the two sets of fixed ambiguities for the first epoch. These are used to calculate a position, in a first iteration 230a of step 230 performed by the third estimator 130. Likewise, in the second iteration 220b of step 220 performed by the selection unit 120, the selection unit 120 chooses the better of the two sets of fixed ambiguities for the second epoch. These are used to calculate a position, in a second iteration 230b of step 230 performed by the third estimator 130. Although just two iterations 230a, 230b by the third estimator 130 are shown in FIG. 3, the third estimator 130 will typically run at a higher rate (that is, have a shorter update interval) than the first and second estimators 102 and 104. Thus, the third estimator 130 may go through several more iterations, between the iterations 230a and 230b illustrated explicitly in the drawing.

Over many iterations, the RF front-end 20 may acquire new GNSS signals. The observables 201 of these new signals will be added to the respective first and second state vectors and the estimators 102, 104 will begin to estimate them. Likewise, carrier-phase lock may be lost and regained several times for a given carrier signal of a given SV. Each time carrier-phase lock is reacquired, the (previously fixed) carrier range ambiguity for that carrier may need to be estimated and fixed again. In this way, the tasks performed by the first and second estimators 102 and 104 change dynamically over iterations, depending on the available observables 201. In each iteration, the selection unit 120 selects the best set of ambiguities for the third estimator 130 to use in calculating the navigation solution (that is, the position and optionally velocity of the receiver).

It should be noted that the above-mentioned embodiments illustrate rather than limit the invention, and that those skilled in the art will be able to design many alternative embodiments without departing from the scope of the appended claims.

In the embodiments described above, the two different strategies for fixing the ambiguities involve, on the one hand, fixing individual ambiguities, and, on the other hand, fixing widelane ambiguities. It should be understood that the scope of the present disclosure is not limited in this respect. Other strategies for fixing ambiguities may be employed. For example, the second strategy may involve fixing a different linear combination of ambiguities (rather than fixing widelane ambiguities). In another example, one strategy may involve fixing a subset of ambiguities, and another strategy may involve fixing all of the ambiguities. In yet another example, one strategy may involve fixing one subset of ambiguities, and another strategy may involve fixing a different (overlapping or non-overlapping) subset of ambiguities. In a further example, the estimators may rely on different models. For instance, one estimator might estimate ionosphere parameters and another estimator might not; or different estimators might make different assumptions about noise type or biases etc. In some examples, the estimators may take different measurements as inputs.

It should also be understood that, in general, more than two different ambiguity-fixing strategies may be employed. There may be one or more further estimators and respective ambiguity resolution units, which apply respective different strategies for fixing the ambiguities. The selection unit 120 may therefore select between more sets of fixed ambiguities than the two sets exemplified in FIGS. 1-3.

In the example of FIGS. 1-3, the first, second, and third estimators 102, 104, 130 are all Kalman filters. However, it should be understood that this is not essential. Some or all of the estimators may be of different types. Suitable alternative types of estimator include but are not limited to:

variants of the Kalman filter—such as the extended Kalman filter (EKF) and the unscented Kalman filter (UKF)—or a least squares (LS) estimator.

In the discussion above, it was explained that each estimator 102, 104, 130 bases its current estimate of the state vector on current measurements and the previous estimate of the respective state vector. This does not necessarily mean that the current measurements must be provided explicitly as an input to the estimator. For example, the update step of a Kalman filter may be implemented by combining the previously estimated state vector with the so-called "innovation"—a difference between the measurements (observables) and the predicted state. Nevertheless, since the innovation is itself based on the current measurements, the resulting current estimate of the state vector is also considered to be (indirectly) based on the current measurements. Nevertheless, it should be understood that if the input to the estimator is the measurement, and the estimator is a Kalman filter, the estimator will compute the innovation, and the measurement update step of the Kalman filter will in general always use the measurement innovation.

In the example described above, the LAMBDA algorithm was used by the ambiguity resolution units 112 and 114 to fix ambiguities. It should be understood that other algorithms are available and may be used instead. One extension of the LAMBDA algorithm is the Best Integer Equivariant (BIE) estimation algorithm (see, for example: P. J. G. Teunissen, "Theory of integer equivariant estimation with application to GNSS", Journal of Geodesy (2003) 77: 402-410). This fixes several candidate sets of integer ambiguities, and then performs a weighted average to determine the final fixed ambiguities. Therefore, although the ambiguities are fixed to integers during the process, the final output of the fixing algorithm comprises floating-point fixed carrier range ambiguities.

Confidence in the fixed ambiguities may also be evaluated in different ways. The example was given of calculating a confidence ratio, comparing the best candidate set with the second best candidate set. This is indeed one convenient and informative way to evaluate the confidence; however, it is by no means essential to adopt this approach. In general, any measure of the quality of the fixed solution may be adopted as a confidence measure. If a confidence measure is compared with a threshold, in order to select between the fixed first carrier range ambiguities and the fixed second carrier range ambiguities, this threshold may be chosen to be a fixed threshold or a dynamic threshold.

In the example of FIG. 1, the entire method—including estimating states, fixing ambiguities, selecting a set of fixed ambiguities, and estimating the position—was carried out on board a navigation processor 100 of a GNSS receiver. However, this is not essential. Some or all the steps of the method may be carried out by a different apparatus. In some examples, some or all of the processing may be delegated to a server computer, for example in a cloud computing environment. The server computer may implement functions corresponding to some or all of the blocks 102, 104, 112, 114, 120, and 130 (for example, as similar software functional blocks). Therefore, the server computer may carry out some or all of steps 202, 204, 212, 214, 220, 230, 242, and 244.

Other variations involve the way that the blocks 102, 104, 112, 114, 120, and 130 are implemented. In the example discussed above, these units were defined in software or software modules running on the navigation processor 100 of the GNSS receiver. However, in other examples, some or all of these units may be implemented in dedicated, fixed-function hardware.

In the claims, any reference signs placed between parentheses shall not be construed as limiting the claim. The word "comprising" does not exclude the presence of elements or steps other than those listed in a claim. However, where the word "comprising" is used, this also discloses as a special case the possibility that the elements or steps listed are exhaustive—that is, the apparatus or method may consist solely of those elements or steps. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method of calculating a position based on Global Navigation Satellite Systems (GNSS) signals, the method comprising:
    estimating a first state vector comprising a first set of float carrier range ambiguities using a first estimator, based on first observations of the GNSS signals;
    estimating a second state vector comprising a second set of float carrier range ambiguities using a second estimator, based on second observations of the GNSS signals;
    fixing one or more first carrier range ambiguities, using a first strategy, based on the first set of float carrier range ambiguities;
    fixing one or more second carrier range ambiguities, using a second strategy, based on the second set of float carrier range ambiguities,
    wherein the first strategy for fixing the one or more first carrier range ambiguities is different from the second strategy for fixing the one or more second carrier range ambiguities,
    the method further comprising:
    selecting a set of fixed carrier range ambiguities from among a plurality of different sets of fixed carrier range ambiguities, the plurality including at least the one or more fixed first carrier range ambiguities and the one or more fixed second carrier range ambiguities; and
    estimating, using a third estimator, the position based on the selected set of fixed carrier range ambiguities.

2. The method of claim 1, wherein the one or more fixed first carrier range ambiguities are fed back into the first estimator in a subsequent iteration of the first estimator.

3. The method of claim 2, wherein the first estimator, when estimating the first state vector in the subsequent iteration, estimates only states other than the one or more fixed first carrier range ambiguities.

4. The method of claim 1, wherein the one or more fixed second carrier range ambiguities are fed back into the second estimator in a subsequent iteration of the second estimator.

5. The method of claim 4, where the second estimator, when estimating the second state vector in the subsequent iteration, estimates only states other than the one or more fixed second carrier range ambiguities.

6. The method of claim 1, wherein the one or more fixed first carrier range ambiguities comprise individual carrier range ambiguities,
    wherein the first strategy comprises fixing the individual carrier range ambiguities.

7. The method of any one of claims 1 and 2-6, wherein the one or more fixed second carrier range ambiguities comprise combinations of carrier range ambiguities,
    wherein the second strategy comprises fixing the combinations of carrier range ambiguities.

8. The method of claim 7, wherein the one or more fixed second carrier range ambiguities comprise widelane carrier range ambiguities.

9. The method of claim 8, wherein the one or more fixed widelane carrier range ambiguities are fed back into the second estimator in a subsequent iteration of the second estimator, wherein the second estimator, when estimating the second state vector in the subsequent iteration, constrains the second set of float carrier range ambiguities such that the widelane carrier range ambiguities are respected.

10. The method of claim 1, wherein:
    the one or more fixed first carrier range ambiguities comprise individual carrier range ambiguities; and
    the one or more fixed second carrier range ambiguities comprise combinations of carrier range ambiguities,
    wherein, if the individual carrier range ambiguities are fixed with a confidence exceeding a threshold, they are selected for use in estimating the position, and
    if the individual carrier range ambiguities are not fixed with a confidence exceeding the threshold, but the combinations of carrier range ambiguities are fixed with a confidence exceeding a threshold, the combinations of carrier range ambiguities are selected for use in estimating the position.

11. The method of claim 1, wherein the first observations and the second observations comprise the same observations.

12. A device comprising:
    at least one processor; and
    a non-transitory computer-readable storage medium coupled to the at least one processor and storing programming instructions for execution by the at least one processor, wherein the programming instructions instruct the device to:
    estimate a first state vector comprising a first set of float carrier range ambiguities using a first estimator, based on first observations of Global Navigation Satellite Systems (GNSS) signals;
    estimate a second state vector comprising a second set of float carrier range ambiguities using a second estimator, based on second observations of the GNSS signals;
    fix one or more first carrier range ambiguities, using a first strategy, based on the first set of float carrier range ambiguities;
    fix one or more second carrier range ambiguities, using a second strategy, based on the second set of float carrier range ambiguities, wherein the first strategy for fixing the one or more first carrier range ambiguities is different from the second strategy for fixing the one or more second carrier range ambiguities,
    select a set of fixed carrier range ambiguities from among a plurality of different sets of fixed carrier range ambiguities, the plurality including at least the one or more fixed first carrier range ambiguities and the one or more fixed second carrier range ambiguities; and
    estimate, using a third estimator, a position based on the selected set of fixed carrier range ambiguities.

13. An apparatus configured to calculate a position based on Global Navigation Satellite Systems (GNSS) signals, the apparatus comprising:
    a first estimator, configured to estimate a first state vector comprising a first set of float carrier range ambiguities, based on first observations of the GNSS signals;
    a second estimator, configured to estimate a second state vector comprising a second set of float carrier range ambiguities, based on second observations of the GNSS signals;

a first ambiguity resolution unit, configured to fix one or more first carrier range ambiguities, using a first strategy, based on the first set of float carrier range ambiguities;

a second ambiguity resolution unit, configured to fix one or more second carrier range ambiguities, using a second strategy, based on the second set of float carrier range ambiguities; and a selection unit, configured to select a set of fixed carrier range ambiguities from among a plurality of different sets of fixed carrier range ambiguities, the plurality including at least the one or more fixed first carrier range ambiguities and the one or more fixed second carrier range ambiguities, wherein the first strategy for fixing the first carrier range ambiguities is different from the second strategy for fixing the second carrier range ambiguities, and wherein the apparatus is configured to estimate the position based on the selected set of fixed carrier range ambiguities.

14. The apparatus of claim 13, further comprising a third estimator, wherein the third estimator is configured to estimate the position based on the selected set of fixed carrier range ambiguities.

* * * * *